United States Patent
Lee et al.

(10) Patent No.: US 12,411,274 B2
(45) Date of Patent: Sep. 9, 2025

(54) POLARIZING PLATE AND OPTICAL DISPLAY DEVICE INCLUDING SAME

(71) Applicant: Samsung SDI Co., Ltd., Yongin-si (KR)

(72) Inventors: Sang Hum Lee, Suwon-si (KR); Jun Mo Koo, Suwon-si (KR); Bong Choon Kim, Suwon-si (KR); Jung Hun You, Suwon-si (KR); Dong Yoon Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 702 days.

(21) Appl. No.: 17/634,220

(22) PCT Filed: Aug. 13, 2020

(86) PCT No.: PCT/KR2020/010768
§ 371 (c)(1),
(2) Date: Feb. 9, 2022

(87) PCT Pub. No.: WO2021/034012
PCT Pub. Date: Feb. 25, 2021

(65) Prior Publication Data
US 2022/0299691 A1    Sep. 22, 2022

(30) Foreign Application Priority Data
Aug. 21, 2019  (KR) .................. 10-2019-0102529

(51) Int. Cl.
*G02B 5/30*    (2006.01)
(52) U.S. Cl.
CPC ......... *G02B 5/3083* (2013.01); *G02B 5/3041* (2013.01)

(58) Field of Classification Search
CPC .. G02B 5/3041; G02B 5/3083; G02B 5/3016; G02B 1/04; G02B 27/281; G02B 5/3025;
(Continued)

(56) References Cited

U.S. PATENT DOCUMENTS

| 2009/0185111 A1 | 7/2009 | Uesaka et al. |
| 2015/0042942 A1 | 2/2015 | Hatanaka et al. |

(Continued)

FOREIGN PATENT DOCUMENTS

| CN | 108780174 A | 11/2018 |
| JP | 2017-181735 A | 10/2017 |

(Continued)

OTHER PUBLICATIONS

Korean Office Action dated May 31, 2022, issued in corresponding Korean Patent Application No. 10-2019-0102529, 5 pages.
(Continued)

*Primary Examiner* — Thomas K Pham
*Assistant Examiner* — Kuei-Jen L Edenfield
(74) *Attorney, Agent, or Firm* — Womble Bond Dickinson (US) LLP

(57) ABSTRACT

A polarizing plate and an optical display apparatus including the same. The polarizing plate includes: a polarizer; and a laminate of a first retardation layer and a second retardation layer, and a third retardation layer sequentially stacked on a lower surface of the polarizer, wherein the first retardation layer may have a slow axis tilted at an angle of +40° to +50° or at an angle of −50° to −40° with respect to an absorption axis or a transmission axis of the polarizer, the slow axis of the first retardation layer is tilted at an angle of +80° to +100° or at an angle of −100° to −80° with respect to a slow axis of the second retardation layer, the first retardation layer exhibits positive wavelength dispersion and has an in-plane retardation of 50 nm to 100 nm at a wavelength of 550 nm, (Continued)

and the second retardation layer has positive wavelength dispersion or flat wavelength dispersion and an in-plane retardation of 180 nm to 240 nm at a wavelength of 550 nm.

20 Claims, 2 Drawing Sheets

(58) Field of Classification Search
CPC .. G02B 5/20; G02B 5/30; G02B 27/28; B32B 7/023; B32B 7/02; B32B 2307/42; C09D 201/00; G02F 1/13363
USPC .................................................. 359/489.06
See application file for complete search history.

(56) References Cited

U.S. PATENT DOCUMENTS

| | | | | |
|---|---|---|---|---|
| 2017/0052300 | A1* | 2/2017 | Takeda | B32B 27/302 |
| 2017/0219756 | A1* | 8/2017 | Lee | G02B 1/11 |
| 2019/0101678 | A1 | 4/2019 | Iida et al. | |
| 2020/0012147 | A1* | 1/2020 | Osato | G02F 1/13363 |
| 2021/0132278 | A1* | 5/2021 | Koo | G02B 1/14 |

FOREIGN PATENT DOCUMENTS

| | | |
|---|---|---|
| KR | 10-2007-0052254 A | 5/2007 |
| KR | 10-2008-0096753 A | 11/2008 |
| KR | 10-2016-0100999 A | 8/2016 |
| KR | 10-2016-0109525 A | 9/2016 |
| KR | 10-2017-0079651 A | 7/2017 |
| KR | 10-2018-0039649 A | 4/2018 |
| TW | 201518791 A | 5/2015 |

OTHER PUBLICATIONS

International Search Report of PCT/KR2020/010768, Nov. 19, 2020, 5 pages.
Chinese Office Action dated Feb. 1, 2024, issued in corresponding Chinese Patent Application No. 202080058165.8 (6 pages).
Chinese Office Action dated Oct. 22, 2024, issued in corresponding Chinese Patent Application No. 202080058165.8 (7 pages).

* cited by examiner

POLARIZING PLATE AND OPTICAL DISPLAY DEVICE INCLUDING SAME

CROSS-REFERENCE TO RELATED APPLICATIONS

This application is a U.S. National Phase Patent Application of International Application Number PCT/KR2020/010768, filed on Aug. 13, 2020, which claims priority of Korean Patent Application Number 10-2019-0102529, filed on Aug. 21, 2019, the entire content of each of which is incorporated herein by reference.

TECHNICAL FIELD

The present invention relates to a polarizing plate and an optical display apparatus including the same. More particularly, the present invention relates to a polarizing plate that can significantly reduce reflectivity in all directions including lateral sides thereof while significantly improving ellipticity, and an optical display apparatus including the same.

BACKGROUND ART

An OLED display requires a polarizing plate in order to improve screen quality by preventing electrode reflection. For an antireflection function, the polarizing plate requires a circular polarizing plate function. For implementation of a circular polarizing plate, two methods, that is, a method using a positive wavelength dispersion material and a method using a negative wavelength dispersion material, are representatively used in the art.

In one conventional method for realizing a circular polarizing plate, a negative wavelength dispersion $\lambda/4$ retardation layer and a positive C plate are sequentially stacked on a lower surface of a polarizer. This method has problems, such as poor processability due to difficulty in attachment to the polarizer through roll-to-roll processing, insufficient strength of the retardation layer to be used as a lower protective film of the polarizer, and limits in improvement in reflectivity and ellipticity. In another method, a $\lambda/2$ retardation layer and a $\lambda/4$ retardation layer are sequentially stacked on the lower surface of the polarizer. However, this method has a problem of high reflectivity in all directions including lateral sides of the polarizing plate. On the other hand, in the circular polarizing plate, a liquid crystal layer may be formed as the $\lambda/4$ retardation layer, the $\lambda/2$ retardation layer or the positive C plate. However, this method requires an alignment layer and has a problem in that an additional process for sequentially transferring these layers to the polarizer is required after coating each of the layers.

The background technique of the present invention is disclosed in Korean Patent Laid-open Publication No. 2007-0052254 and the like.

DISCLOSURE

Technical Problem

It is one object of the present invention to provide a polarizing plate that exhibits very low reflectivity in all directions including lateral sides thereof.

It is another object of the present invention to provide a polarizing plate that exhibits very high ellipticity in all directions including lateral sides thereof.

It is a further object of the present invention to provide a polarizing plate that includes a polarizer protective film enabling thickness reduction of the polarizing plate while securing good processability and mechanical strength thereof.

Technical Solution

One aspect of the present invention relates to a polarizing plate.

1. The polarizing plate includes: a polarizer; and a laminate of a first retardation layer and a second retardation layer and a third retardation layer sequentially stacked on a lower surface of the polarizer, wherein the first retardation layer may have a slow axis tilted at an angle of +40° to +50° or at an angle of −50° to −40° with respect to an absorption axis or a transmission axis of the polarizer, the slow axis of the first retardation layer is tilted at an angle of +80° to +100° or at an angle of −100° to −80° with respect to a slow axis of the second retardation layer, the first retardation layer exhibits positive wavelength dispersion and has an in-plane retardation of 50 nm to 100 nm at a wavelength of 550 nm, and the second retardation layer exhibits positive wavelength dispersion or flat wavelength dispersion and has an in-plane retardation of 180 nm to 240 nm at a wavelength of 550 nm.

2. In 1, the first retardation layer, the second retardation layer, and the third retardation layer may be sequentially stacked on the polarizer in the stated order.

3. In 1 to 2, the second retardation layer, the first retardation layer, and the third retardation layer may be sequentially stacked on the polarizer in the stated order.

4. In 1 to 3, the third retardation layer may be a positive C plate and may have an out-of-plane retardation of −100 nm to −10 nm at a wavelength of 500 nm.

5, In 1 to 4, the first retardation layer may be a negative A plate.

6. In 1 to 5, the second retardation layer may be a positive A plate or a negative B plate.

7. In 1 to 6, the first retardation layer may satisfy Relation 1:

$$Re(450)/Re(550) \geq 1.1, \quad (1)$$

where Re(450) and Re(550) are in-plane retardations of the first retardation layer at a wavelength of 450 nm and at a wavelength of 550 nm, respectively.

8. In 1 to 7, the first retardation layer may have a degree of biaxiality of −0.5 to 0 at a wavelength of 550 nm.

9. In 1 to 8, the second retardation layer may satisfy Relation 3:

$$0.95 \leq Re(450)/Re(550) \leq 1.03, \quad (3)$$

where Re(450) and Re(550) are in-plane retardations of the second retardation layer at a wavelength of 450 nm and at a wavelength of 550 nm, respectively.

10, In 1 to 9, the second retardation layer may have a degree of biaxiality of 1.0 to 1.4 at a wavelength of 550 nm.

11. In 1 to 10, the slow axis of the second retardation layer may be tilted at an angle of +40° to +50°, at an angle of −50° to −40°, at an angle of +130° to +140° or at an angle of −140° to −130° with respect to the absorption axis or the transmission axis of the polarizer.

12, In 1 to 11, assuming that the absorption axis of the polarizer is disposed at an angle of 0°, the slow axis of the first retardation layer may be tilted at an angle of +40° to +50° and an angle defined between the slow axis of the first retardation layer and the slow axis of the second retardation layer may range from +80° to +100°.

13, In 1 to 12, the laminate of the first retardation layer and the second retardation layer may have an in-plane retardation of 100 nm to 180 nm at a wavelength of 550 nm.

14. In 1 to 13, the laminate of the first retardation layer and the second retardation layer may have a degree of biaxiality of −0.2 to 1.4 at a wavelength of 550 nm.

15. In 1 to 14, each of the first retardation layer and the third retardation layer may be a non-crystal layer.

16. In 1 to 15, each of the first retardation layer and the third retardation layer may include a coating layer formed of a composition comprising at least one selected from the group consisting of substituted or unsubstituted styrene resins, substituted or unsubstituted (meth)acrylonitrile resins, substituted or unsubstituted alkyl (meth)acrylate resins including methyl (meth)acrylate, and cellulose resins.

17. In 16, the composition may further include an additive having an aromatic group.

18. In 1 to 17, the second retardation layer may include an MID uniaxially stretched film or an obliquely stretched film.

19. In 1 to 18, each of the first retardation layer, the second retardation layer, and the third retardation layer may include a primer layer on at least one surface thereof.

Advantageous Effects

Another aspect of the present invention relates to an optical display apparatus including the polarizing plate according to the present invention.

The present invention provides a polarizing plate that exhibits very low reflectivity in all directions including lateral sides thereof.

The present invention provides a polarizing plate that exhibits very high ellipticity in all directions including lateral sides thereof.

The present invention provides a polarizing plate that includes a polarizer protective film enabling thickness reduction while securing good processability and mechanical strength.

BEST MODE

Embodiments of the present invention will be described in detail with reference to the accompanying drawings such that the present invention can be easily implemented by those skilled in the art. It should be understood that the present invention may be embodied in different ways and is not limited to the following embodiments. In the drawings, portions irrelevant to the description will be omitted for clarity. Like components will be denoted by like reference numerals throughout the specification. Although lengths, thicknesses or widths of various components may be exaggerated for understanding in the drawings, it should be understood that the present invention is not limited thereto.

Herein, spatially relative terms such as "upper" and "lower" are defined with reference to the accompanying drawings. Thus, it will be understood that the term "upper surface" can be used interchangeably with the term "lower surface".

Herein, "in-plane retardation Re", "out-of-plane retardation Rth", and "degree of biaxiality NZ" are represented by Equations A, B and C, respectively:

$$Re=(nx-ny)\times d, \quad (A)$$

$$Rth=((nx+ny)/2-nz)\times d, \quad (B)$$

$$NZ=(nx-nz)/(nx-ny), \quad (C)$$

where nx, ny, and nz denote indexes of refraction of a corresponding optical device in the slow axis direction, the fast axis direction and the thickness direction of the optical device at a measurement wavelength, respectively, and d denotes the thickness of the optical device (unit: nm). In Equations A to C, the measurement wavelength may be 450 nm, 550 nm or 650 nm.

As used herein to represent an angle, "+" means a counterclockwise direction about a reference point and "−" means a clockwise direction about the reference point with reference to 0°.

As used herein to represent a specific numerical range, the expression "X to Y" means "X≤ and ≤Y".

Based on the confirmation that, with a structure wherein a laminate of a first retardation layer and a second retardation layer, and a third retardation layer are sequentially stacked on one surface of a polarizer, specifically on a display panel side surface thereof, a polarizing plate can significantly reduce reflectivity in all directions including lateral sides thereof while significantly improving ellipticity by controlling wavelength dispersion and in-plane retardation of each of the first retardation layer and the second retardation layer, an angle between the absorption axis of the polarizer and the slow axis of the first retardation layer, and an angle between the slow axis of the first retardation layer and the slow axis of the second retardation layer within the ranges of the present invention, the inventors of the present invention completed the present invention. In addition, the polarizing plate according to the present invention includes the first retardation layer, the second retardation layer, and the third retardation layer on one surface of the polarizer to allow manufacture of the to polarizing plate through roll-to-roll processing, thereby improving processability while securing good mechanical strength of the layers as a polarizer protective film.

In one embodiment, the polarizing plate may include a polarizer; and a first retardation layer, a second retardation layer, and a third retardation layer, which are sequentially stacked on a lower surface of the polarizer.

In another embodiment, the polarizing plate may include a polarizer; and a second retardation layer, a first retardation layer, and a third retardation layer, which are sequentially stacked on a lower surface of the polarizer.

Hereinafter, the polarizing plate according to one embodiment of the present invention will be described with reference to FIG. 1.

Figure 1:
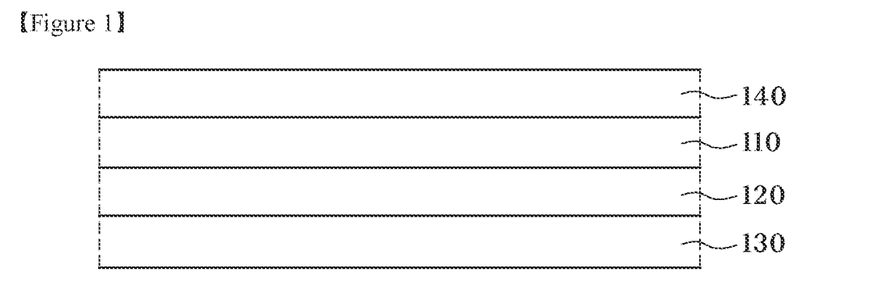
FIG. 1 is a sectional view of a polarizing plate according to one embodiment of the present invention.

Referring to FIG. 1, the polarizing plate includes a polarizer 140; and a first retardation layer 110, a second retardation layer 120, and a third retardation layer 130, which are sequentially stacked on a lower surface of the polarizer 140.

Although not shown in FIG. 1, the third retardation layer 130 includes an adhesive layer and/or a bonding layer on a lower surface thereof to stack the polarizing plate on an adherent, for example, an optical display panel including a light emitting device panel and the like.

In the polarizing plate, an absorption axis or a transmission axis of the polarizer, a slow axis of the first retardation layer, and the slow axis of the second retardation layer satisfy a certain angle relationship therebetween. Hereinafter, this will be described with reference to FIG. 2.

Figure 2:
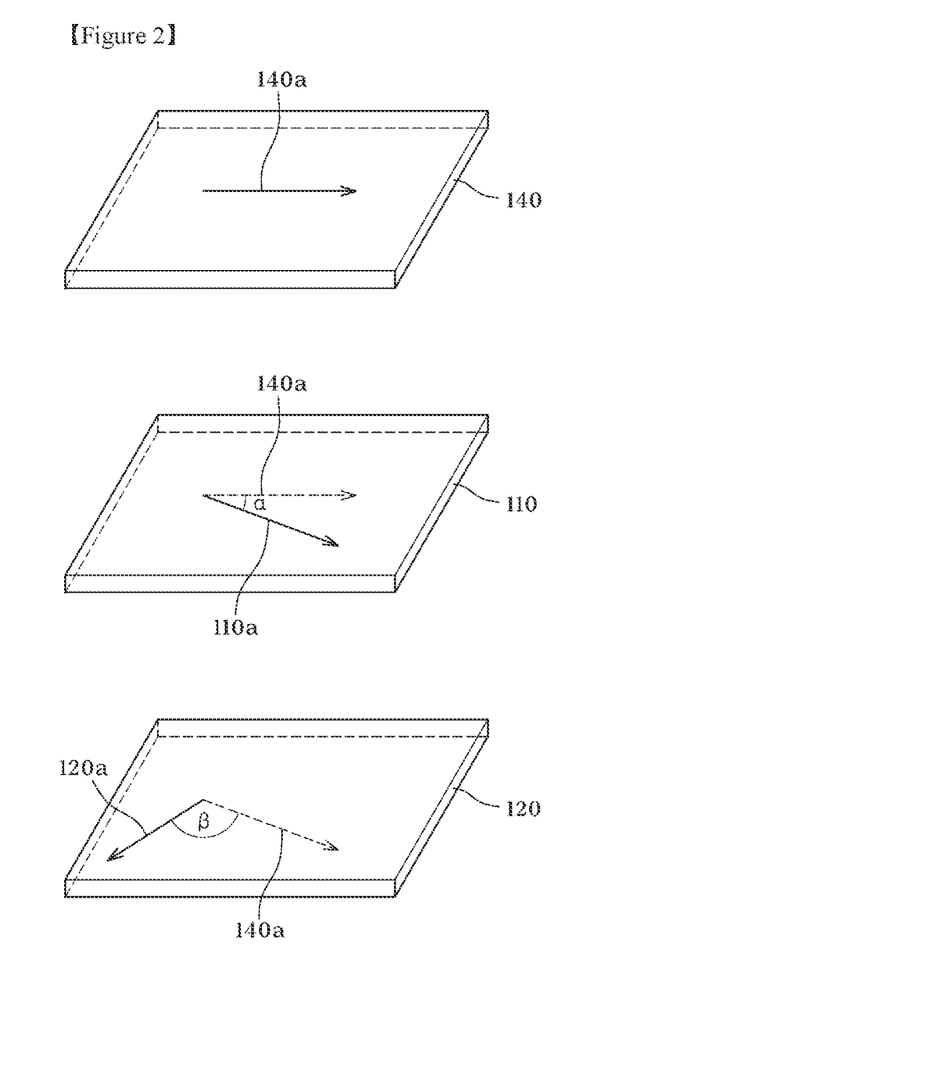
FIG. 2 is a diagram illustrating angles defined between an absorption axis of a polarizer, a slow axis of a first layer and a slow axis of a second layer in the polarizing plate shown in FIG. 1.

Referring to FIG. 2, the slow axis 110a of the first retardation layer 110 is tilted at an angle α of +40° to +50° or at an angle of −50° to −40° with reference to the absorption axis 140a of the polarizer 140, and an angle β defined between the slow axis 110a of the first retardation layer 110 and the slow axis 120a of the second retardation layer 120 may range from +80° to +100° or from −100° to −80°. As in the polarizing plate according to the present invention, when the polarizing plate including all of the first retardation layer, the second retardation layer and the third retardation layer has the angles α and β within the above ranges, it is possible to achieve significant improvement in ellipticity and reflectivity in all directions including lateral sides thereof.

In one embodiment, the angle α may range from +42° to +48°, specifically from +43° to +47°, preferably +45°. In another embodiment, the angle α may range from −48° to −42°, specifically from −47° to −43°, preferably −45°.

In one embodiment, the angle β may range from +83° to +97°, specifically from +85° to +95°, preferably +90°. In another embodiment, the angle β may range from −97° to −83°, specifically from −95° to −85°, preferably −90°.

FIG. 2 shows an angle defined between the absorption axis of the polarizer and the slow axis of the first retardation layer. Alternatively, the tilted angle of the slow axis of the first retardation layer may be set with reference to the transmission axis of the polarizer. Preferably, the tilted angle of the slow axis of the first retardation layer is set with reference to the absorption axis of the polarizer.

In one embodiment, assuming that the absorption axis of the polarizer is disposed at an angle of 0°, the slow axis of the first retardation layer may be tilted at an angle α of +40° to +50° (for example, +40°, +41°, +42°, +43°, +44°, +45°, +46°, +47°, +48°, +49°, or +50°) with reference to the absorption axis of the polarizer, and the angle β between the slow axis of the first retardation layer and the slow axis of the second retardation layer may range from +80° to +100° (for example, +80°, +85°, +90°, +95°, or +100°).

In another embodiment, assuming that the absorption axis of the polarizer is disposed at an angle of 0°, the slow axis of the first retardation layer may be tilted at an angle α of −40° to −50°, and the angle β between the slow axis of the first retardation layer and the slow axis of the second retardation layer may range from −80° to −100°.

On the other hand, the inventors of the present invention confirmed that the polarizing plate can improve reflectivity and ellipticity only through controlling the above three types of angles when applied to an optical display. Accordingly, for each of the first retardation layer and the second retardation layer, wavelength dispersion and in-plane retardation at a wavelength of 550 nm are controlled. In particular, in the polarizing plate according to the present invention, it was confirmed that reflectivity and ellipticity of the polarizing plate could be significantly improved by the first retardation layer and the second retardation layer having in-plane retardation at a wavelength of 550 nm in a significantly different range than λ/2 in-plane retardation and λ/4 in-plane retardation known in the art while controlling wavelength dispersion of each of the first retardation layer and the second retardation layer.

Hereinafter, the first retardation layer, the second retardation layer, the third retardation layer, and the polarizer of the polarizing plate will be described in detail.

First Retardation Layer

The first retardation layer 110 exhibits positive wavelength dispersion and has an in-plane retardation of 50 nm to 100 nm (for example, 50 nm, 60 nm, 70 nm, 80 nm, 90 nm, or 100 nm) at a wavelength of 550 nm. Here, the 'positive wavelength dispersion' means that the in-plane retardation gradually decreases with increasing wavelength from 450 nm to 650 nm.

In one embodiment, the first retardation layer may exhibit positive wavelength dispersion at a wavelength of 450 nm to 550 nm.

In one embodiment, the first retardation layer may exhibit positive wavelength dispersion or flat wavelength dispersion at a wavelength of 550 nm to 650 nm.

The first retardation layer serves to improve ellipticity and reflectivity of the polarizing plate at lateral sides thereof. In particular, the first retardation layer 110 has a different in-plane retardation than a typical λ/4 in-plane retardation at a wavelength of 550 nm and exhibits positive wavelength dispersion, thereby improving reflectivity and ellipticity of the polarizing plate. For example, the first retardation layer 110 may have an in-plane retardation of 50 nm to 90 nm, specifically 50 nm to 80 nm, more specifically 50 nm to 70 nm, at a wavelength of 550 nm.

In one embodiment, the first retardation layer 110 may satisfy the following Relation 1:

$$Re(450)/Re(550) \geq 1.1$$

$$0.9 \leq Re(650)/Re(550) < 1.0 \text{ or } Re(650)/Re(550) = 1.0 \quad \text{[Relation 1]}$$

where Re(450), Re(550), and Re(650) are in-plane retardation values of the first retardation layer at wavelengths of 450 nm, 550 nm, and 650 nm, respectively.

When the first retardation layer 110 satisfies Relation 1, the first retardation layer 110 can serve to improve ellipticity and reflectivity of the polarizing plate at the lateral sides thereof.

In one embodiment, Re(450)/Re(550) may range from 1.1 to 1.4, preferably from 1.2 to 1.3. Within this range, the polarizing plate can exhibit good anti-reflection effects.

In one embodiment, Re(650)/Re(550) may range from 0.9 to 1.0, preferably from 0.93 to less than 1.0. Within this range, the polarizing plate can exhibit good anti-reflection effects.

For example, the first retardation layer may have an Re(450) of 60 nm to 90 nm, specifically 70 nm to 80 nm, and an Re(650) of 40 nm to 70 nm, specifically 50 nm to 60 nm. Within this range, the polarizing plate can exhibit good anti-reflection effects.

As a negative A plate (−A plate), the first retardation layer 110 may satisfy Relation 2:

$$nx \approx nz > ny, \quad (2)$$

where nx denotes the index of refraction of the first retardation layer in the slow axis direction thereof, ny denotes the index of refraction of the first retardation layer in the fast axis direction thereof, and nz denotes the index of refraction of the first retardation layer in the thickness direction thereof. These indexes of refraction are measured at a wavelength of 550 nm.

When the −A plate is used as the first retardation layer, the polarizing plate can exhibit further improved anti-reflection effects.

The first retardation layer 110 may have an out-of-plane retardation of −100 nm to 0 nm, specifically −80 nm to −20 nm, preferably −60 nm to −30 nm, at a wavelength of 550 nm. Within this range, the polarizing plate can exhibit good anti-reflection effects.

The first retardation layer 110 may have a degree of biaxiality of −0.5 to 0, specifically −0.4 to 0, at a wavelength of 550 nm. Within this range, the polarizing plate can exhibit good anti-reflection effects.

The first retardation layer 110 may be a film or a coating layer. Herein, the "coating layer" means a layer formed by coating a first retardation layer composition on the second retardation layer or a base film, followed by curing. Preferably, the first retardation layer is a coating layer to allow reduction in thickness of the polarizing plate. The first retardation layer 110 may have a thickness of 30 μm or less, for example, greater than 0 μm to 10 μm. Within this range, the first retardation layer 110 can be used in the polarizing plate and allows reduction in thickness of the polarizing plate.

When the first retardation layer 110 is a film, the first retardation layer 110 may be formed by stretching an optically transparent non-stretched resin film such that the resin film exhibits the above properties including in-plane retardation and the like. Here, stretching may include uniaxial stretching, biaxial stretching or oblique stretching. For example, the resin film may include at least one selected from the group consisting of polyester resins including polycarbonate, polyethylene terephthalate, polyethylene naphthalate, and the like, polyamide resins, polyarylate resins, polyimide resins, polyolefin resins, such as polyethylene, polypropylene, and the like, and cyclic olefin polymers (COP).

When the first retardation layer 110 is a coating layer, the first retardation layer 110 may include a coating layer formed of a composition including a monomer, oligomer or resin for coating layers.

In one embodiment, the first retardation layer 110 may be a non-crystal layer. When the first retardation layer is formed of liquid crystals, it is necessary to form an alignment layer for alignment of the liquid crystals at a certain angle and foreign matter can be generated.

The monomer, oligomer or resin for coating layers may include at least one selected from the group consisting of substituted or unsubstituted styrene resins, substituted or unsubstituted (meth)acrylonitrile resins, substituted or unsubstituted alkyl (meth)acrylate resins including methyl (meth)acrylate, and cellulose resins, preferably substituted or unsubstituted cellulose resins, for example, cellulose ester resins. The cellulose ester resin allows easy implementation of the first retardation layer according to the present invention and easy formation of a stack of the first retardation layer and the second retardation layer by stretching both a first retardation layer film and a second retardation layer film after coating the first retardation layer composition on the second retardation layer film. Herein, substitution means that at least one hydrogen atom is substituted with a halogen atom, a linear or branched $C_1$ to $C_{20}$ alkyl group, a $C_6$ to $C_{20}$ aryl group, a linear or branched $C_1$ to $C_{20}$ alkyl group-containing acyl group, or a $C_6$ to $C_{20}$ aryl group-containing acyl group, without being limited thereto.

In one embodiment, the first retardation layer may be formed of a composition including a cellulose ester compound.

In another embodiment, the first retardation layer may be formed of a composition including a cellulose ester compound and an aromatic fused-ring containing compound.

The cellulose ester compound may include at least one selected from the group consisting of a cellulose ester resin, a cellulose ester oligomer, and a cellulose ester monomer.

The cellulose ester compound refers to a condensation product obtained through reaction between a hydroxyl group on a cellulose ester and a carboxylic acid group of carboxylic acid. The cellulose ester compound may be regioselectively or randomly substituted. Regioselectivity may be measured by determining a relative degree of substitution at the positions of $C_6$, $C_3$ and $C_2$ on the cellulose ester by carbon 13 NMR.

The cellulose ester compound may be prepared by a typical method through contact between a cellulose solution and at least one $C_1$ to $C_{20}$ acylation agent for a sufficient contact time to provide a cellulose ester having a desired degree of substitution and a desired degree of polymerization. Preferably, the acylation agent includes at least one linear or branched $C_1$ to $C_{20}$ alkyl or aryl carboxylic anhydride, carboxylic acid halide, diketone, or acetoacetic ester. Examples of the carboxylic anhydride may include acetic anhydride, propionic anhydride, butyric anhydride, isobutyric anhydride, valeric anhydride, hexanoic anhydride, 2-ethyl hexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl, propionyl, butyryl, hexanoyl, 2-ethylhexanoyl, lauroyl, palmitoyl, benzoyl, substituted benzoyl, and stearoyl chlorides. Examples of the acetoacetic ester may include methyl acetoacetate, ethyl acetoacetate, propyl acetoacetate, butyl acetoacetate, and tertiary butyl acetoacetate. Most preferably, the acylation agent may include linear or branched $C_2$ to $C_9$ alkyl carboxylic acid anhydrides, such as acetic anhydride, propionic anhydride, butyric anhydride, 2-ethylhexanoic anhydride, nonanoic anhydride, and stearic anhydride.

Preferably, the cellulose ester compound includes, for example, cellulose acetate (CA), cellulose acetate propionate (CAP), and cellulose acetate butyrate (CAB), without being limited thereto.

In one embodiment, the cellulose ester compound may include at least two acyl group substituents. At least one of the acyl groups may include an aromatic substituent and, in the cellulose ester compound, a relative degree of substitution (RDS) may be set in the order of C6>C2>C3. C6 means a degree of substitution at the position of the number 6 carbon in the cellulose ester, C2 means a degree of substitution at the number 2 carbon in the cellulose ester, and C3 means a degree of substitution at the number 3 carbon in the cellulose ester. The aromatic compound may include benzoate or substituted benzoate.

In another embodiment, the cellulose ester compound may include a regioselectively substituted cellulose ester compound having (a) a plurality of chromophore-acyl substituents and (b) a plurality of pivaloyl substituents,

The cellulose ester compound may have a degree of hydroxyl group substitution of about 0.1 to about 1.2 and a degree of chromophore-acyl substitution of about 0.4 to about 1.6; a difference between a total sum of the degree of chromophore-acyl substitution at the number 2 carbon in the cellulose ester compound and the degree of chromophore-acyl substitution at the number 3 carbon in the cellulose ester compound and the degree of chromophore-acyl substitution at the number 6 carbon in the cellulose ester compound may range from about 0.1 to about 1.6; and the chromophore-acyl may be selected from among (i), (ii), (iii), and (iv):

(i) ($C_6$-$C_{20}$)aryl-acyl, where aryl is unsubstituted or substituted with 1 to 5 $R^1$s;

(ii) hetero aryl, where hetero aryl is a five to ten-membered ring having 1 to 4 hetero atoms selected from among N, O and S, and is unsubstituted or substituted with 1 to 5 $R^1$s;

(iii)

where aryl is $C_1$-$C_6$ aryl and is unsubstituted or substituted with 1 to 5 $R^1$s; and (iv)

where hetero aryl is a five to ten-membered ring having 1 to 4 hetero atoms selected from among N, O and S, and is unsubstituted or substituted with 1 to 5 $R^1$s, $R^1$s being each independently nitro, cyano, ($C_1$-$C_6$)alkyl, halo($C_1$-$C_6$)alkyl, ($C_6$-$C_{20}$)aryl-$CO_2$—, ($C_6$-$C_{20}$)aryl, ($C_1$-$C_6$)alkoxy, halo($C_1$-$C_6$)alkoxy, halo, five to ten-membered heteroaryl having 1 to 4 hetero atoms selected from among N, O and S, or In one embodiment, the chromophore-acyl may be unsubstituted or substituted benzoyl or unsubstituted or substituted naphthyl.

In one embodiment, the chromophore-acyl may be selected from the group consisting of:

where * indicates a linking site of the chromophore-acyl substituent to oxygen of the cellulose ester.

The first retardation layer may further include an aromatic fused-ring containing additive.

The aromatic fused-ring containing additive serves to adjust a retardation exhibition rate and wavelength dispersion of the first retardation layer,

The aromatic fused-ring containing additive may include naphthalene, anthracene, phenanthrene, pyrene, a compound represented by Formula 1, or a compound represented by Formula 2. The aromatic fused-ring containing additive may include 2-naphthyl benzoate, 2,6-naphthalene dicarboxylic acid diester represented by Formula 3, naphthalene, and an abietic acid ester represented by Formula 4, without being limited thereto:

[Formula 1]

[Formula 2]

[Formula 3]

(In Formula 3, R is a $C_1$ to $C_{20}$ alkyl group or a $C_6$ to $C_{20}$ aryl group and n is an integer of 0 to 6.)

[Formula 4]

(In Formula 4, R is a $C_1$ to $C_{20}$ alkyl group or a $C_6$ to $C_{20}$ aryl group.)

Preferably, the aromatic fused-ring containing additive includes an additive having an aromatic ring, for example, at least one selected from among naphthalene, anthracene, phenanthrene, pyrene, 2-naphthyl benzoate, and 2,6-naphthalene dicarboxylic acid diester represented by Formula 3.

The aromatic fused-ring containing additive may be present in an amount of 0.1 wt % to 30 wt %, preferably 10 wt % to 30 wt %, in the first retardation layer. Within this range, the additive can improve thermal stability of the composition and retardation of the polarizing plate per thickness, and can adjust wavelength dispersion.

The first retardation layer 110 may further include at least one typical additive known to those skilled in the art, for example, at least one selected from among a UV absorbent, a wavelength dispersion regulator, a polymerization inhibitor, an antioxidant, a heat stabilizer, a plasticizer, an anti-blocking agent, a slipping agent, a lubricant, and a retardation enhancer, without being limited thereto.

The first retardation layer 110 may be constituted by a single layer or multiple layers.

Although not shown in FIG. 1, a primer layer may be formed on at least one surface of the first retardation layer 110. The primer layer serves to enhance adhesive strength or bonding strength between the first retardation layer and the polarizer or between the first retardation layer and the second retardation layer. The primer layer may be formed of a resin known to those skilled in the art, for example, an acrylic resin, a urethane resin, an acrylic urethane resin, an ester resin, and an ethylene imine resin, without being limited thereto. Thickness of the primer layer may be adjusted within the range not affecting thickness reduction of the polarizing plate and adhesive strength thereof. For example, the primer layer may have a thickness of 10 nm to 500 nm, specifically 50 nm to 300 nm.

The first retardation layer 110 may be directly formed on the second retardation layer 120 without an adhesive layer or a bonding layer, or may be formed thereon via an adhesive layer (for example, a PSA (pressure sensitive adhesive) layer) or a bonding layer. Herein, the expression "directly formed on" means that no adhesive layer or bonding layer is present between the first retardation layer and the second retardation layer.

Second Retardation Layer

The second retardation layer 120 exhibits positive wavelength dispersion or flat wavelength dispersion and has an in-plane retardation of 180 nm to 240 nm (for example, 180 nm, 190 nm, 200 nm, 210 nm, 220 nm, 230 nm, or 240 nm) at a wavelength of 550 nm. The "positive wavelength dispersion" is the same as described above. The "flat wavelength dispersion" means that in-plane retardation is not substantially increased or decreased with increasing wavelength from 450 nm to 650 nm.

The second retardation layer 120 serves to improve ellipticity and reflectivity of the polarizing plate at lateral sides thereof. In particular, the second retardation layer 120 has a different in-plane retardation than a typical λ/2 in-plane retardation at a wavelength of 550 nm and exhibits positive wavelength dispersion or flat wavelength dispersion, thereby improving reflectivity and ellipticity of the polarizing plate. For example, the second retardation layer 120 may have an in-plane retardation of 180 nm to 230 nm, specifically 180 nm to 220 nm, at a wavelength of 550 nm.

In one embodiment, the second retardation layer 120 may satisfy the following Relation 3:

$$0.95 \leq Re(450)/Re(550) \leq 1.03$$

$$0.95 \leq Re(650)/Re(550) \leq 1.03 \qquad \text{[Relation 3]}$$

where Re(450), Re(550), and Re(650) are in-plane retardation values of the second retardation layer at wavelengths of 450 nm, 550 nm, and 650 nm, respectively.

When the second retardation layer 120 satisfies Relation 3, the second retardation layer 120 can serve to improve ellipticity and reflectivity of the polarizing plate at the lateral sides thereof.

In one embodiment, Re(450)/Re(550) may range from 0.95 to 1.03, preferably from 0.97 to 1.03. Within this range, the polarizing plate can exhibit good anti-reflection effects.

In one embodiment, Re(650)/Re(550) may range from 0.95 to 1.03, preferably from 0.97 to 1.03. Within this range, the polarizing plate can exhibit good anti-reflection effects.

For example, the second retardation layer may have an Re(450) of 180 nm to 240 nm, specifically 200 nm to 230 nm, and an Re(650) of 180 nm to 240 nm, specifically 190 nm to 230 nm.

As the positive A plate (+A plate) or the negative B plate (−B plate), the second retardation layer 120 may satisfy Relation 4 or 5:

$$nx > ny \approx nz, \quad (4)$$

$$nx > ny > nz, \quad (5)$$

where nx denotes the index of refraction of the second retardation layer in the slow axis direction thereof, ny denotes the index of refraction of the second retardation layer in the fast axis direction thereof, and nz denotes the index of refraction of the second retardation layer in the thickness direction thereof. These indexes of refraction are measured at a wavelength of 550 nm.

When the +A plate or the −B plate is used as the second retardation layer, the polarizing plate can exhibit further improved anti-reflection effects.

The second retardation layer 120 may have an out-of-plane retardation of 50 nm to 250 nm, specifically 80 nm to 200 nm, preferably 100 nm to 180 nm, at a wavelength of 550 nm. Within this range, the polarizing plate can exhibit good anti-reflection effects.

The second retardation layer 120 may have a degree of biaxiality of 1.0 to 1.4 (for example, 1.1, 1.2, 1.3 or 1.4), specifically greater than 1.0 to 1.4, at a wavelength of 550 nm, Within this range, the polarizing plate can exhibit good anti-reflection effects.

With reference to the absorption axis or the transmission axis of the polarizer, the second retardation layer 120 may have a slow axis tilted at an angle of +40° to +50° (for example, +40°, +41°, +42°, +43°, +44°, +45°, +46°, +47°, +48°, +49°, or +50°), −50° to −40° (for example, −50°, −49°, −48°, −47°, −46°, −45°, −44°, −43°, −42°, −41°, or −40°), +130° to +140° (for example, +131°, +132°, +133°, +134°, +135°, +136°, +137°, +138°, +139°, or 140°), or −140° to −130° (for example, −140°, −139°, −138°, −137°, −136°, −135°, −134°, −133°, −132°, −131°, or −130°.

The second retardation layer 120 may be a film or a coating layer. Preferably, the second retardation layer is a film to facilitate formation of the first retardation layer and the third retardation layer in the polarizing plate. The second retardation layer 120 may have a thickness of 60 μm or less, for example, greater than 0 μm to 50 μm. Within this range, the second retardation layer 120 can be used in the polarizing plate and can act as a lower protective film of the polarizing plate.

When the second retardation layer 120 is a film, the second retardation layer 120 may be formed by stretching the optically transparent non-stretched resin film such that the resin film exhibits the above properties including in-plane retardation and the like. Here, stretching may include uniaxial stretching, biaxial stretching or oblique stretching. Preferably, the resin film may include a resin film including a cyclic olefin polymer (COP). Preferably, the second retardation layer is an MID uniaxially stretched film or an obliquely stretched film.

In one embodiment, the second retardation layer 120 may have a retardation exhibition rate (ratio of variation in in-plane retardation of the second retardation layer to variation in thickness of the second retardation layer) of 5 nm/μm or more, preferably greater than 5 nm/μm, for example, 5 nm/μm to 20 nm/μm. Within this range, the second retardation layer can have a thin thickness, thereby enabling reduction in thickness of the polarizing plate.

The second retardation layer 120 may further include at least one typical additive known to those skilled in the art, for example, at least one selected from among a UV absorbent, a wavelength dispersion regulator, a polymerization inhibitor, an antioxidant, a heat stabilizer, and a plasticizer, without being limited thereto.

The second retardation layer 120 may be constituted by a single layer or multiple layers.

The laminate of the first retardation layer 110 and the second retardation layer 120 may have an in-plane retardation of 100 nm to 180 nm (for example, 100 nm, 110 nm, 120 nm, 130 nm, 140 nm, 150 nm, 160 nm, 170 nm, or 180 nm), specifically 120 nm to 160 nm, at a wavelength of 550 nm. Within this range, the laminate can further effectively realize the advantageous effects of the present invention.

The laminate of the first retardation layer 110 and the second retardation layer 120 may have an out-of-plane retardation of 50 nm to 120 nm, specifically 50 nm to 110 nm, at a wavelength of 550 nm. Within this range, the laminate can further effectively realize the advantageous effects of the present invention.

The laminate of the first retardation layer 110 and the second retardation layer 120 may have a degree of biaxiality of −0.2 to 1.4, specifically −0.1 to 1.3, at a wavelength of 550 nm. Within this range, the laminate can further effectively realize the advantageous effects of the present invention.

Although not shown in FIG. 1, a primer layer may be formed on at least one surface of the second retardation layer 120. The primer layer is the same as that described above.

The second retardation layer 120 may be directly formed on the third retardation layer 130 without an adhesive layer or a bonding layer, or may be formed thereon via an adhesive layer (for example, a PSA (pressure sensitive adhesive) layer) or a bonding layer. Herein, the expression "directly formed on" means that no adhesive layer or bonding layer is present between the second retardation layer and the second retardation layer.

Third Retardation Layer

The third retardation layer 130 has different in-plane retardation and/or out-of-plane retardation at a wavelength of 550 nm than the first retardation layer 110 and the second retardation layer 120.

The third retardation layer 130 is formed on a lower surface of the second retardation layer 120, thereby significantly reducing reflectivity at the lateral sides of the polarizing plate while improving ellipticity. It was confirmed that the absence of the third retardation layer resulted in poor effect on both reflectivity and ellipticity in the structure of the polarizing plate shown in FIG. 1.

The third retardation layer 130 may have an out-of-plane retardation of −100 nm to −10 nm (for example, −100 nm, −90 nm, −80 nm, −70 nm, −60 nm, −50 nm, −40 nm, −30 nm, 20 nm, or −10 nm) at a wavelength of 550 nm. Within this range, the third retardation layer 130 can improve reflectivity and ellipticity at the lateral sides together with the first retardation layer and the second retardation layer. Preferably, the third retardation layer 130 has an out-of-plane retardation of −90 nm to −30 nm, more preferably −80 nm to −40 nm, at a wavelength of 550 nm.

As a positive C plate (+C plate), the third retardation layer 130 may satisfy Relation 6:

$$nz \geq nx = ny, \quad (6)$$

where nx denotes the index of refraction of the third retardation layer in the slow axis direction thereof, ny denotes the index of refraction of the third retardation layer in the fast axis direction thereof, and nz denotes the index of refraction of the third retardation layer in the thickness direction thereof. These indexes of refraction are measured at a wavelength of 550 nm.

When the +C plate is used as the third retardation layer, the polarizing plate can exhibit further improved anti-reflection effects at the lateral sides thereof.

The third retardation layer 130 may have an in-plane retardation of 10 nm or less, for example, 0 nm to 10 nm, at a wavelength of 550 nm.

The third retardation layer 130 may exhibit positive wavelength dispersion, negative wavelength dispersion or flat wavelength dispersion.

The third retardation layer 130 may be a film or a coating layer. Preferably, the third retardation layer is a coating layer, thereby enabling reduction in thickness of the polarizing plate. The third retardation layer 130 may have a thickness of 30 μm or less, for example, greater than 0 μm to 10 μm. Within this range, the third retardation layer 130 can be used in the polarizing plate and allows reduction in thickness of the polarizing plate.

When the third retardation layer 130 is a film, the third retardation layer 130 may be formed by stretching the optically transparent non-stretched resin film such that the resin film exhibits the above properties including in-plane retardation and the like. Here, stretching may include uniaxial stretching, biaxial stretching or oblique stretching.

When the third retardation layer 130 is a coating layer, the third retardation layer 130 may be a non-crystal layer. When the third retardation layer 130 is formed of liquid crystals, it is necessary to form an alignment layer for alignment of the liquid crystals at a certain angle and foreign matter can be generated.

The coating layer may be formed of any material so long as the coating layer can realize out-of-plane retardation and a positive C plate. For example, the coating layer may include at least one selected from the group consisting of substituted or unsubstituted styrene resins, substituted or unsubstituted (meth)acrylonitrile resins, substituted or unsubstituted alkyl (meth)acrylate resins including methyl (meth)acrylate, and cellulose resins, preferably substituted or unsubstituted cellulose resins, for example, a cellulose ester resin. The cellulose ester resin allows easy implementation of the third retardation layer.

In one embodiment, the first retardation layer, the second retardation layer, and the third retardation layer may be integrally formed therewith. Herein, "integrally" means a tri-layer laminate in which the first retardation layer and the third retardation layer are stacked on the second retardation layer without an adhesive layer or a bonding layer therebetween.

Hereinafter, manufacture of the tri-layer laminate will be described.

The laminate of the first retardation layer and the second retardation layer may be manufactured by coating the first retardation layer composition to a predetermined thickness on an upper surface of a non-stretched or partially stretched film for the second retardation layer, followed by stretching the non-stretched or partially stretched film and the coating for the first retardation layer at the same time. Herein, stretching may be MD uniaxial stretching or oblique stretching, without being limited thereto. Thereafter, the tri-layer laminate may be manufactured by coating a third retardation layer composition on a lower surface of the second retardation layer, followed by drying and/or curing.

Polarizer

The polarizer 140 serves to convert natural light or polarized light into polarized light. The polarizer 140 has an absorption axis and a transmission axis orthogonal to the absorption axis. Each of the absorption axis and the transmission axis is disposed in one direction.

The polarizer may be manufactured from a polymer film mainly consisting of a polyvinyl alcohol resin. Specifically, the polarizer may be manufactured by dyeing the polymer film with iodine or dichroic dyes, followed by stretching the dyed film in the machine direction (MD). Specifically, the polarizer may be manufactured through swelling, dyeing, stretching, and crosslinking processes.

The polarizer 140 may have a total light transmittance of 42% or more, for example, 42% to 50%, and a degree of polarization of 99% or more, for example, 99% to 100%. Within these ranges, the polarizer can improve antireflection performance of the polarizing plate through combination with the first retardation layer, the second retardation layer, and the third retardation layer.

The polarizer 140 may have a thickness of 0.1 μm to 30 μm, specifically 1 μm to about 25 μm. Within this range, the polarizer can be used in the polarizing plate.

Although not shown in FIG. 1, a protective film may be formed on an upper surface of the polarizer 140.

The protective film formed on the upper surface of the polarizer serves to protect the polarizer from an external environment while improving mechanical strength of the polarizing plate. The protective film may be an optically transparent film formed of, for example, at least one resin selected from among cellulose resins including triacetylcellulose (TAC) and the like, polyester resins including polyethylene terephthalate (PET), polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. Specifically, the protective film may be a TAC film or a PET film.

The protective film may have a thickness of about 5 μm to about 70 μm, specifically about 15 μm to about 45 μm. Within this range, the protective film can be used in the polarizing plate.

A functional coating layer may be further formed on an upper surface of the protective film to provide additional functions to the polarizing plate. For example, the functional coating layer may include a hard coating layer, an anti-fingerprint layer, and an anti-reflection layer. These functional coating layers may be stacked alone or in combination thereof. The protective film may be attached to the polarizer via a bonding layer. The bonding layer may be formed of a water-based or UV curable bonding agent, without being limited thereto.

Next, a polarizing plate according to another embodiment of the present invention will be described with reference to FIG. 3.

Figure 3:
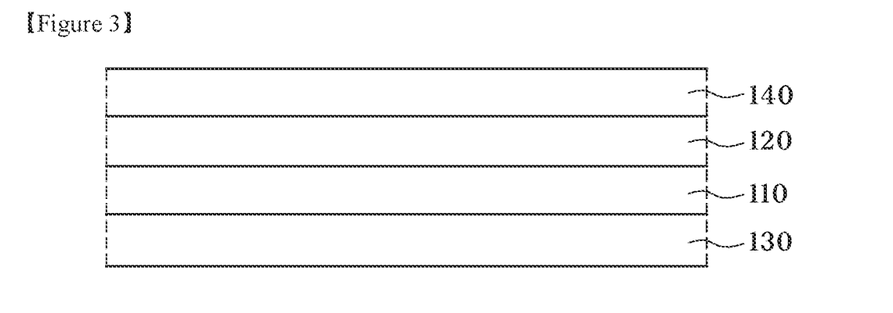
FIG. 3 is a sectional view of a polarizing plate according to another embodiment of the present invention.

Referring to FIG. 3, the polarizing plate according to this embodiment is substantially the same as the polarizing plate shown in FIG. 1 except that the polarizer 140, the second retardation layer 120, the first retardation layer 110, and the third retardation layer 130 are sequentially stacked in the stated order. Details of the polarizer, the first retardation layer, the second retardation layer, and the third retardation layer described with reference to FIG. 1 may also be applied to the polarizing plate according to this embodiment.

Next, an optical display apparatus according to the present invention will be described.

The optical display apparatus according to the present invention may include the polarizing plate according to the embodiments of the invention. For example, the optical display apparatus may include a light emitting display apparatus including an organic liquid crystal display, a liquid crystal display apparatus, and the like. In one embodiment, in the polarizing plate, the first retardation layer may be disposed closer to a panel of the display apparatus than the polarizer.

Next, the present invention will be described in more detail with reference to examples. However, it should be noted that these examples are provided for illustration only and should not be construed in any way as limiting the invention.

Example 1

A polyvinyl alcohol film (PS #60, pre-stretching thickness: 60 μm, Kuraray Co., Ltd., Japan) was stretched to 6 times an initial length thereof in an aqueous solution of iodine at 55° C., thereby preparing a 12 μm thick polarizer having a transmittance of 45%.

As a resin for a second retardation layer, a cyclic polyolefin film (COP) [JSR] was extruded and stretched. A (cellulose-containing) composition for a first retardation layer was coated to a predetermined thickness on an upper surface of the stretched film, dried and stretched together with the stretched film for the second retardation layer, thereby preparing a laminate of the first retardation layer and the second retardation layer. Here, the angle between the slow axis of the first retardation layer and the slow axis of the second retardation layer and properties of each of the first retardation layer and the second retardation layer may be adjusted through adjustment of the stretching ratio and the stretching direction.

A third retardation layer was formed on a lower surface of the second retardation layer by coating a (cellulose-containing) third retardation layer composition [Eastman Co., Ltd.], followed by drying the composition, thereby manufacturing a laminate of the first retardation layer, the second retardation layer, and the third retardation layer.

Then, a polarizing plate was manufactured by sequentially stacking the first retardation layer, the second retardation layer, and the third retardation layer on a lower surface of the polarizer.

Detailed specification of the manufactured polarizing plate is shown in Table 1.

Examples 2 to 5

Each of polarizing plates was manufactured in the same manner as in Example 1 except that properties and angles of the first retardation layer, the second retardation layer, and the third retardation layer were changed.

Comparative Example 1

A polarizing plate was manufactured in the same manner as in Example 1 except that a negative wavelength dispersion film (+A plate, slow axis tilted at +45° with respect to the absorption axis of the polarizer, in-plane retardation: 135 nm at a wavelength of 550 nm), and a positive C plate (out-of-plane retardation: −50 nm at a wavelength of 550 nm) were sequentially stacked on the lower surface of the polarizer.

Comparative Examples 2 to 11

Each of polarizing plates was manufactured in the same manner as in Example 1 except that properties and angles of the first retardation layer, the second retardation layer, and the third retardation layer were changed.

The polarizing plates manufactured in Examples and Comparative Examples were evaluated as to reflectivity and ellipticity at a lateral side (@60°) and results are shown in Tables 1 to 3.

For evaluation of reflectivity and ellipticity at the lateral side, reflectivity was evaluated by comparing an average azimuth angle at an angle of 60° using DMS and ellipticity was evaluated by comparing the lowest values at an azimuth angle using an AXOSCAN.

Lower reflectivity and higher ellipticity indicate better screen quality of a display apparatus including the corresponding polarizing plate. Reflectivity of 1.3% or less and ellipticity of 75% or more are required.

TABLE 1

| | | Example | | | | |
|---|---|---|---|---|---|---|
| | | 1 | 2 | 3 | 4 | 5 |
| Angle α | | +45 | −45 | +45 | +45 | +45 |
| Angle β | | +90 | −90 | +90 | +90 | +90 |
| First layer | Dispersion | Positive wavelength | Positive wavelength | Positive wavelength | Positive wavelength | Positive wavelength |
| | Re | 60 | 60 | 60 | 50 | 60 |
| | NZ | −0.2 | −0.2 | −0.2 | −0.2 | −0.2 |
| | Property | −A | −A | −A | −A | −A |
| Second layer | Dispersion | Flat | Flat | Positive wavelength | Flat | Flat |
| | Re | 200 | 200 | 200 | 200 | 180 |
| | NZ | 1.2 | 1.2 | 1.0 | 1.2 | 1.2 |
| | Property | −B | −B | +A | −B | −B |
| Third layer | Rth | −50 | −50 | −50 | −50 | −50 |
| | Property | +C | +C | +C | +C | +C |
| Re of laminate of first layer and second layer | | 140 | 140 | 140 | 150 | 120 |

TABLE 1-continued

|  | Example | | | | |
|---|---|---|---|---|---|
|  | 1 | 2 | 3 | 4 | 5 |
| Rth of laminate of first layer and second layer | 98 | 98 | 58 | 105 | 84 |
| NZ of laminate of first layer and second layer | 1.2 | 1.2 | 0.9 | 1.2 | 1.2 |
| Reflectivity (%) at lateral side | 1.2 | 1.2 | 1.3 | 1.3 | 1.2 |
| Ellipticity (%) at lateral side | 76 | 76 | 75 | 75 | 75 |

TABLE 2

|  |  | Comparative Example | | | | | |
|---|---|---|---|---|---|---|---|
|  |  | 1 | 2 | 3 | 4 | 5 | 6 |
|  | Angle α | +45 | +45 | +45 | +35 | +55 | +45 |
|  | Angle β | – | +90 | +90 | +90 | +90 | +75 |
| First layer | Dispersion | Negative wavelength | Negative wavelength | Positive wavelength | Positive wavelength | Positive wavelength | Positive wavelength |
|  | Re | 135 | 60 | 60 | 60 | 60 | 60 |
|  | Property | – | –A | –A | –A | –A | –A |
| Second layer | Dispersion | – | Flat | Negative wavelength | Flat | Flat | Flat |
|  | Re | – | 200 | 200 | 200 | 200 | 200 |
|  | Property | – | –B | –B | –B | –B | –B |
| Third layer | Rth | –50 | –50 | –50 | –50 | –50 | –50 |
|  | Property | +C | +C | +C | +C | +C | +C |
| Reflectivity (%) at lateral side |  | 1.5 | 1.8 | 1.7 | 2.1 | 2.2 | 2.4 |
| Ellipticity (%) at lateral side |  | 74 | 71 | 72 | 70 | 69 | 68 |

TABLE 3

|  |  | Comparative Example | | | | |
|---|---|---|---|---|---|---|
|  |  | 7 | 8 | 9 | 10 | 11 |
|  | Angle α | +45 | +45 | +45 | +45 | +45 |
|  | Angle β | +105 | +90 | +90 | +90 | +90 |
| First layer | Dispersion | Positive wavelength | Positive wavelength | Positive wavelength | Positive wavelength | Positive wavelength |
|  | Re | 60 | 45 | 105 | 60 | 60 |
|  | Property | –A | –A | –A | –A | –A |
| Second layer | Dispersion | Flat | Flat | Flat | Flat | Flat |
|  | Re | 200 | 200 | 200 | 175 | 245 |
|  | Property | –B | –B | –B | –B | –B |
| Third layer | Rth | –50 | –50 | –50 | –50 | –50 |
|  | Property | +C | +C | +C | +C | +C |
| Reflectivity (%) at lateral side |  | 2.5 | 2.7 | 3.0 | 3.2 | 3.3 |
| Ellipticity (%) at lateral side |  | 67 | 66 | 64 | 63 | 62 |

**In Tables 1, 2 and 3,
angle α refers to an angle of the slow axis of the first retardation layer with respect to the absorption axis (0°) of the polarizer (unit: °) angle β refers to an angle defined between the slow axis of the first retardation layer and the slow axis of the second retardation layer (unit: °)

As shown in Table 1, the polarizing plate according to the present invention had very low reflectivity and very high ellipticity.

On the contrary, the polarizing plate of Comparative Example 1 not employing the polarizing plate structure according to the present invention had poorer reflectivity and ellipticity than the polarizing plates of Examples. In addition, although not shown in Table 1, this polarizing plate had problems, such as difficulty in attachment of the first retardation to layer and the third retardation layer to the polarizer through roll-to-roll processing and insufficient mechanical strength of the retardation layers as a lower protective film for the polarizer.

Further, the polarizing plates of Comparative Examples 2 to 11 failed to satisfy the conditions for the angle α, the angle β, wavelength dispersion and in-plane retardation of the first retardation layer, and wavelength dispersion and in-plane retardation of the second retardation layer, and had much poorer reflectivity and ellipticity than the polarizing plates of Examples.

Although some embodiments have been described herein, it should be understood that various modifications, changes, alterations, and equivalent embodiments can be made by those skilled in the art without departing from the spirit and scope of the present invention.

The invention claimed is:

1. A polarizing plate comprising:
a polarizer;
a laminate of a first retardation layer and a second retardation layer; and
a third retardation layer,
wherein the laminate and the third retardation layer are sequentially stacked on a lower surface of the polarizer,
wherein the first retardation layer has a slow axis tilted at an angle of +40° to +50° or at an angle of −50° to −40° with respect to an absorption axis or a transmission axis of the polarizer,
the slow axis of the first retardation layer is tilted at an angle of +80° to +100° or at an angle of −100° to −80° with respect to a slow axis of the second retardation layer,
the first retardation layer exhibits positive wavelength dispersion and has an in-plane retardation of 50 nm to 90 nm at a wavelength of 550 nm, and
the second retardation layer exhibits positive wavelength dispersion or flat wavelength dispersion and has an in-plane retardation of 180 nm to 240 nm at a wavelength of 550 nm,
wherein the third retardation layer is a positive C plate,
wherein the first retardation layer has an out-of-plane retardation of −100 nm to 0 nm at a wavelength of 550 nm.

2. The polarizing plate according to claim 1, wherein the first retardation layer, the second retardation layer, and the third retardation layer are sequentially stacked on the polarizer.

3. The polarizing plate according to claim 1, wherein the second retardation layer, the first retardation layer, and the third retardation layer are sequentially stacked on the polarizer.

4. The polarizing plate according to claim 1, wherein the third retardation layer has an out-of-plane retardation of −100 nm to −10 nm at a wavelength of 550 nm.

5. The polarizing plate according to claim 1, wherein the first retardation layer is a negative A plate.

6. The polarizing plate according to claim 1, wherein the second retardation layer is a positive A plate or a negative B plate.

7. The polarizing plate according to claim 1, wherein the first retardation layer satisfies Relation 1:

$$Re(450)/Re(550) \geq 1.1, \quad (1)$$

where Re(450) and Re(550) are in-plane retardations of the first retardation layer at a wavelength of 450 nm and at a wavelength of 550 nm, respectively.

8. The polarizing plate according to claim 1, wherein the first retardation layer has a degree of biaxiality of −0.5 to 0 at a wavelength of 550 nm.

9. The polarizing plate according to claim 1, wherein the second retardation layer satisfies Relation 3:

$$0.95 \leq Re(450)/Re(550) \leq 1.03, \quad (3)$$

where Re(450) and Re(550) are in-plane retardations of the second retardation layer at a wavelength of 450 nm and at a wavelength of 550 nm, respectively.

10. The polarizing plate according to claim 1, wherein the second retardation layer has a degree of biaxiality of 1.0 to 1.4 at a wavelength of 550 nm.

11. The polarizing plate according to claim 1, wherein the slow axis of the second retardation layer is tilted at an angle of +40° to +50°, at an angle of −50° to −40°, at an angle of +130° to +140° or at an angle of −140° to −130° with respect to the absorption axis or the transmission axis of the polarizer.

12. The polarizing plate according to claim 1, wherein, assuming that the absorption axis of the polarizer is disposed at an angle of 0°, the slow axis of the first retardation layer is tilted at an angle of +40° to +50° and an angle defined between the slow axis of the first retardation layer and the slow axis of the second retardation layer ranges from +80° to +100°.

13. The polarizing plate according to claim 1, wherein the laminate of the first retardation layer and the second retardation layer has a degree of biaxiality of −0.2 to 1.4 at a wavelength of 550 nm.

14. The polarizing plate according to claim 1, wherein each of the first retardation layer and the third retardation layer is a non-crystal layer.

15. The polarizing plate according to claim 1, wherein each of the first retardation layer and the third retardation layer comprises a coating layer formed of a composition comprising at least one selected from the group consisting of substituted or unsubstituted styrene resins, substituted or unsubstituted (meth)acrylonitrile resins, substituted or unsubstituted alkyl (meth)acrylate resins including methyl (meth)acrylate, and cellulose resins.

16. The polarizing plate according to claim 15, wherein the composition further comprises an aromatic group-containing additive.

17. The polarizing plate according to claim 1, wherein the second retardation layer comprises an MD uniaxially stretched film or an obliquely stretched film.

18. The polarizing plate according to claim 1, wherein each of the first retardation layer, the second retardation layer, and the third retardation layer comprises a primer layer on at least one surface thereof.

19. An optical display apparatus comprising the polarizing plate according to claim 1.

20. A polarizing plate comprising:
a polarizer;
a laminate of a first retardation layer and a second retardation layer; and
a third retardation layer,
wherein the laminate and the third retardation layer are sequentially stacked on a lower surface of the polarizer such that the laminate is between the third retardation layer and the lower surface of the polarizer,
wherein the first retardation layer has a slow axis tilted at an angle of +40° to +50° or at an angle of −50° to −40° with respect to an absorption axis or a transmission axis of the polarizer,
the slow axis of the first retardation layer is tilted at an angle of +80° to +100° or at an angle of −100° to −80° with respect to a slow axis of the second retardation layer, the first retardation layer exhibits positive wavelength dispersion and has an in-plane retardation of 50 nm to 100 nm at a wavelength of 550 nm, the second retardation layer exhibits positive wavelength dispersion or flat wavelength dispersion and has an in-plane retardation of 180 nm to 240 nm at a wavelength of 550 nm, and the laminate of the first retardation layer and the second retardation layer has an in-plane retardation of 100 nm to 180 nm at a wavelength of 550 nm.

* * * * *